United States Patent

Phillips

[19]

[11] Patent Number: 5,838,524
[45] Date of Patent: Nov. 17, 1998

[54] CURRENT LIMIT CIRCUIT FOR INHIBITING VOLTAGE OVERSHOOT

[75] Inventor: Timothy A. Phillips, Cranston, R.I.

[73] Assignee: Cherry Semiconductor Corporation, East Greenwich, R.I.

[21] Appl. No.: 820,880

[22] Filed: Mar. 21, 1997

[51] Int. Cl.$^6$ ...................................................... H02H 7/00
[52] U.S. Cl. ................................. 361/18; 361/86; 361/91
[58] Field of Search .................................. 361/18, 54, 56, 361/57, 78, 86, 88, 91; 363/74, 78; 323/265, 273, 277, 901

[56] References Cited

U.S. PATENT DOCUMENTS

5,617,051  4/1997  Bingham .................................... 361/18

*Primary Examiner*—Sally C. Medley
*Attorney, Agent, or Firm*—Bromberg & Sunstein LLP

[57] ABSTRACT

A current limit circuit for preventing voltage overshoot in a driver circuit. A diode is coupled to the output terminal of the driver circuit. The diode's junction capacitance is utilized to reduce a current limit threshold in order to control the rate of change of the output voltage at the output terminal. A bias control circuit regulates a pass transistor to prevent load current provided by the driver circuit from exceeding the current limit threshold. The cathode of the diode is coupled to the output terminal so that the voltage at the cathode of the diode is responsive to the output voltage of the driver terminal. The base of a transistor is coupled to the anode of the diode so that the transistor conducts current at its collector when there is a sufficiently large rate of change in the output voltage. The collector current of the transistor reduces a reference current applied to a current mirror. The current mirror is coupled to a bias control circuit so that when the reference current is reduced, the current limit threshold of the driver circuit is also reduced. The diode, transistor, current mirror, and bias control circuit prevent overshoots by reducing the current limit threshold when a sufficiently large rate of change in the output voltage is detected, which prevents the pass transistor from overdriving the output node.

15 Claims, 6 Drawing Sheets

CURRENT LIMIT CIRCUIT FOR INHIBITING VOLTAGE OVERSHOOT

FIELD OF THE INVENTION

The present invention relates to a current limit circuit for inhibiting voltage overshoot in a driver circuit.

BACKGROUND OF THE INVENTION

To provide a reference voltage to a load in which the reference voltage is obtained from a voltage source or circuit with a high output impedance, it is often required to interpose a driver circuit between the reference voltage source and the load, where the driver circuit has a high input impedance and a low output impedance. Such driver circuits contain feedback or control loop circuitry to control or regulate the load voltage (or a scaled version of it) to be as close as possible to the reference voltage. However, in some situations the load voltage may exceed the reference voltage for short durations of time, which we refer to as voltage overshoots.

Voltage overshoot may occur during startup or during large power supply voltage transients. For example, at the startup of many circuits with feedback, the node at which the load voltage is being controlled may display a voltage overshoot in its transient response. The voltage overshoot is directly related to the control loop's phase response and gain, which are derived from the circuit's poles and zeroes.

Voltage overshoots can be a problem for a number of reasons. It can be a source of high frequency noise in a system. Also, the node at which the load voltage is being controlled may achieve a voltage that can be destructive for some particular circuits.

Figure 1:
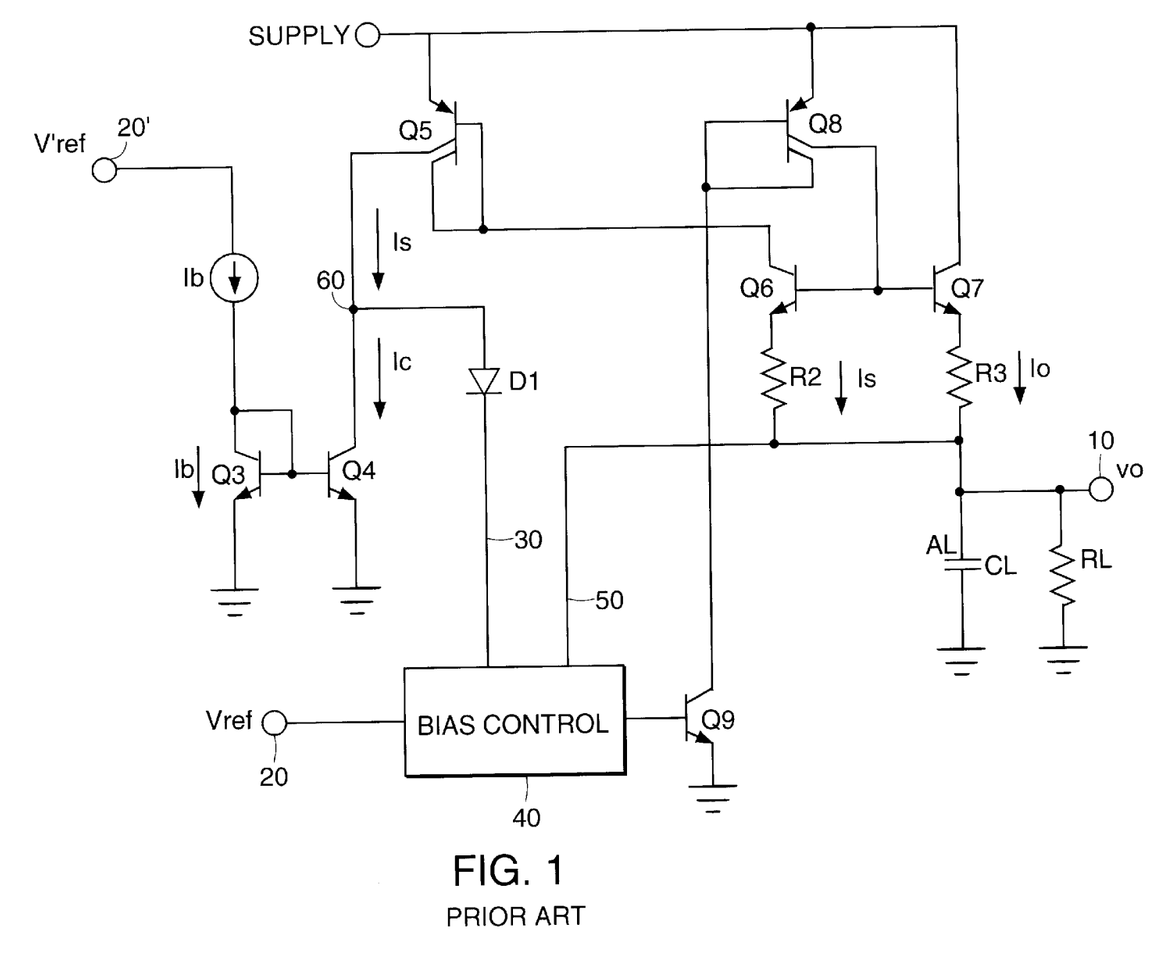
FIG. 1 is a high-level circuit diagram of a prior art driver circuit.

FIG. 1 shows a simplified circuit diagram for a typical driver circuit, or high-side voltage control circuit, for controlling the output voltage $V_0$ at terminal 10 to be as close as possible to a reference voltage applied to terminal 20. Another reference voltage is applied to terminal 20' to provide bias current I$b$, and in general it is different from the reference voltage applied to terminal 20.

To simplify the explanation of FIG. 1, let us first assume that diode $D_1$ is not forward biased, so that no current is flowing on line 30. With no current on line 30, bias control circuit 40 behaves as an error amplifier and provides an error signal at the base of transistor Q9 in response to the difference between $V_0$ and $V_{ref}$. The error signal applied to the base of transistor Q9 controls the collector current of transistor Q9, which is mirrored by current mirror Q8 to the base of transistors Q6 and Q7. An increase in the error signal applied to transistor Q9 increases the base current to transistor Q7, which in turn increases the emitter current $I_0$ of transistor Q7 to thereby increase the load voltage $V_0$. Negative feedback from terminal 10 to bias control circuit 40 is simply provided by line 50, so that the error signal applied to transistor Q9 increases in voltage as $V_0$ decreases below $V_{ref}$ and decreases in voltage as $V_0$ increases toward $V_{ref}$.

In this way, bias control circuit 40 in conjunction with the control loop comprising transistor Q9, current mirror Q8, transistor Q7, emitter resistor $R_3$, and load $R_L$ tries to maintain $V_0$ equal to $V_{ref}$.

We now consider the more general case in which $D_1$ may be forward biased, and consider the current limit function of the remainder of the circuit in FIG. 1.

The function of diode $D_1$ in conjunction with bias control circuit 40, along with transistor Q6, current mirror Q5, and the current mirror comprising transistors Q3 and Q4, is to limit the emitter current $I_0$ so that it does not exceed a current limit threshold, where the current limit threshold is set by reference or bias current $I_b$. We define the current limit threshold as the value of $I_0$ for which $I_s$ equals $I_b$. The current limit threshold also depends upon the relationship between $I_s$ and $I_0$, which in turn depends upon the ratio of emitter areas between transistors Q6 and Q7, as well as the resistances of resistors $R_2$ and $R_3$. The effect of current on line 30 upon bias control circuit 40 is to decrease the voltage (and current) of the error signal applied to the base of transistor Q9, which thereby reduces the emitter current $I_0$ provided to load $R_L$. Transistors Q6 and Q7 are configured so that the emitter current $I_s$ of transistor Q6 is indicative of emitter current $I_0$. Emitter current $I_s$ may be considered a sense current. Current $I_s$ is mirrored by current mirror Q5 to node 60.

The current mirror comprising transistors Q3 and Q4 is biased by reference current $I_b$ and is coupled to node 60 via the collector of transistor Q4. The collector current of transistor Q4 is denoted as $I_c$. The current mirror comprising transistors Q3 and Q4 clamps the collector current $I_c$ so as not to exceed $I_b$. When $I_s < I_b$, the arrangement of current mirror Q5 and transistors Q3 and Q4 is such that collector current $I_c$ is clamped at $I_s$, and diode $D_1$ is not forward biased. However, if $I_s > I_b$, then $I_c$ is clamped at $I_b$ and diode $D_1$ will be forward biased. Thus, only when $I_s$ exceeds $I_b$ is diode $D_1$ forward biased, and the circuit of FIG. 1 tries to prevent the current $I_0$ supplied to load $R_L$ from exceeding the current limit threshold.

However, the circuit of FIG. 1 may be ineffective in limiting the output voltage $V_0$ to $V_{ref}$ at startup for several reasons. At start up, the output voltage is initially at approximately zero volts, and bias control circuit 40 will place a voltage at the base of transistor Q9 to start up the circuit. Consequently, transistor Q7 will conduct and $V_0$ will begin to rise. Because $V_0$ is initially less than $V_{ref}$, bias control circuit 40 will continue to increase the voltage at the base of transistor Q9 until transistor Q7 is fully turned on (overdriven but not in saturation) and conducting its maximum current. When $V_0$ finally does reach $V_{ref}$, the control loop is, in general, too slow to reduce base current to the base of transistor Q7. Consequently, pass transistor Q7 will remain on and will transfer charge to the reservoir capacitor $C_L$ and cause overshoot. The amount of time required to remove the build up of charge at the base of transistor Q7 is the amount of time that the circuit will slew past the ideal constant settling voltage $V_{ref}$.

As discussed above, the current limiting function provided by transistors Q6, Q3, Q4, current mirror Q5, and diode $D_1$, sets the maximum load current, and consequently, this current limiting function will try to keep transistor Q7 from going into saturation. However, the circuit of FIG. 1 does not necessarily limit voltage overshoots at the output because when $V_0$ reaches $V_{ref}$, transistor Q7 is still supplying too much current to the load.

In the past, voltage clamps have been used to limit the peak voltage at the output of driver circuits. However, voltage clamps are not always effective at eliminating voltage overshoots because the voltage clamp must be fast enough to "catch" the rising edge of a voltage overshoot. Furthermore, voltage clamps generally are not effective for high current outputs because of the difficulty of disabling the driver circuit in time to limit the voltage overshoot to a reasonable level.

SUMMARY OF THE INVENTION

It is an aspect of the present invention to prevent voltage overshoot at the output of a driver circuit.

It is another aspect of the present invention to control the output current of the driver circuit by smartly reducing the current through a pass transistor as the output current rises and by preventing the pass transistor from being fully turned on.

In an embodiment of the present invention, a diode is coupled to the output terminal of a driver circuit and its junction capacitance is utilized to reduce a current limit threshold depending upon the rate of change of the output voltage at the output terminal. A bias control circuit regulates a pass transistor to prevent load current provided by the driver circuit from exceeding the current limit threshold. The cathode of the diode is coupled to the output terminal so that the voltage at the cathode of the diode is responsive to the output voltage of the driver terminal. The base of a transistor is coupled to the anode of the diode so that the transistor conducts current at its collector when there is a sufficiently large rate of change in the output voltage. The collector current of the transistor reduces a reference current applied to a current mirror. The current mirror is coupled to a bias control circuit so that when the reference current is reduced, the current limit threshold of the driver circuit is also reduced. The diode, transistor, current mirror, and bias control circuit prevent overshoots by reducing the current limit threshold when a sufficiently large rate of change in the output voltage is detected, which prevents the pass transistor from fully turning on.

DETAILED DESCRIPTION OF THE PREFERRED EMBODIMENTS

Figure 2:
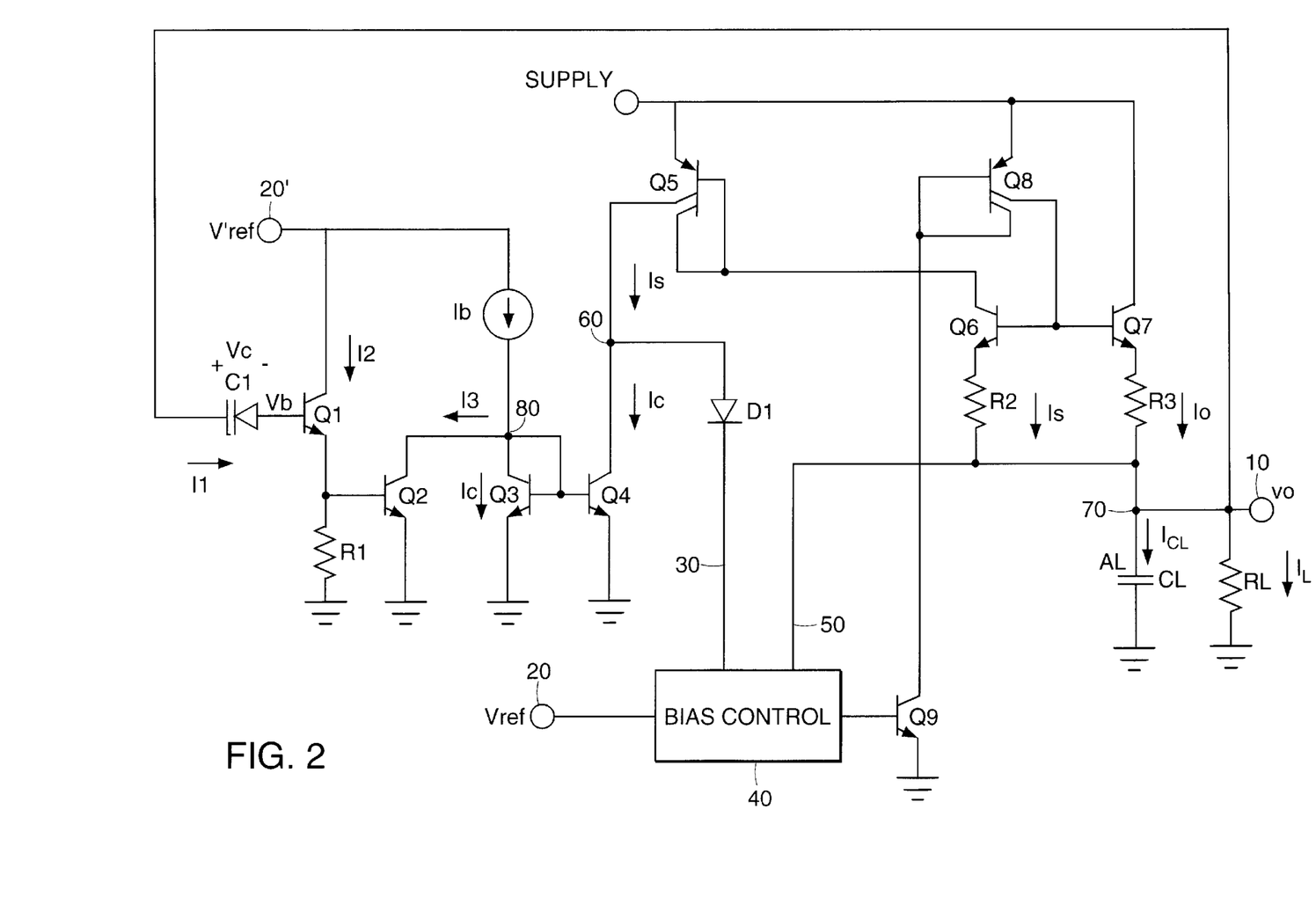
FIG. 2 is a high-level circuit diagram of an embodiment of the present invention.

A high-level circuit diagram of an embodiment of the present invention is shown in FIG. 2, where corresponding components in FIGS. 1 and 2 are labeled with the same alpha-numeric reference. In comparing FIGS. 1 and 2, we see that diode $C_1$, transistors Q1 and Q2, and resistor $R_1$ have been added.

The junction capacitance of diode $C_1$ is utilized to reduce the current limit threshold of the circuit of FIG. 2. A qualitative explanation of the circuit of FIG. 2 is as follows: The junction capacitance of diode $C_1$ will transfer a rapid increase in the output voltage $V_O$ to the base of transistor Q1. More precisely, letting all transistor base-emitter forward voltage drops be equal to each other and denoted by $V_{be}$, if the output voltage $V_O$ is greater than $2V_{be}$ and if the rate of change of $V_O$ is large enough so that $dV_O/dt \geq V_{be}/((\beta+1)(R_1)(C_1))$, where the beta value of transistor Q1 is $\beta$, the resistance of resistor $R_1$ is also denoted by the symbol $R_1$, and the capacitance of diode $C_1$ is also denoted by the symbol $C_1$, then the junction capacitance of diode $C_1$ will cause transistor Q1 to go into conduction, which in turn will bring transistor Q2 into conduction. When brought into conduction, transistor Q2 will sink a current $I_3$ at its collector, which will reduce the current $I_C$ conducted by transistor Q3. Current $I_c$ is mirrored by the current mirror comprising transistors Q3 and Q4. Thus, from the previous discussion regarding FIG. 1, we see that a reduction in $I_c$ results in a reduction of the current limit threshold. A sufficient reduction in the current limit threshold will cause bias control circuit 40 to prevent pass transistor Q7 from being completely turned on when the output voltage $V_O$ is rapidly increasing. In this way, the embodiment illustrated in FIG. 2 prevents voltage overshoot at output terminal 10.

An expression for the maximum slew rate, $dV_O/dt$, is derived as follows. Referring to FIG. 2, the voltage $V_b$ at the base of transistor Q1 is two base-emitter voltage drops above ground, $$V_b = 2V_{be}. \tag{1}$$

Denoting the potential voltage drop across the junction capacitance of diode $C_1$ by $V_C$, the output voltage $V_O$ is $$V_O = V_C + V_b. \tag{2}$$

From the transistor action of transistor Q1 with a beta value of $\beta$, we have (assuming that it is not in saturation)

$$I_1 = I_2/\beta = V_{be}/(R_1 {}^*B). \tag{3}$$

The rate of change of the potential difference $V_C$ is $$I_1 = C_1 {}^* d(V_C)/dt. \tag{4}$$

Because Vb is approximately constant, $d(V_C)/dt = d(V_O)/dt$, and therefore we obtain an approximate expression for the maximum slew rate, $$d(V_O)/dt = I_1/C_1 = V_{be}/(C_1 {}^* R_1 \cdot \beta). \tag{5}$$

The collector current of Q2 is determined by the following analysis. First, we determine the current $I_0$ based upon $d(V_O)/dt$ as follows. At node 70, we have $$I_0 = I_{CL} + I_L + I_1. \tag{6}$$

The current $I_1$ in terms of $d(V_O)/dt$ has already been given in equation (5). Currents $I_{CL}$ and $I_L$ are given by:

$$I_L = V_O/R_L, \text{ and} \tag{7}$$

$$I_{CL} = C_L {}^* d(V_O)/dt. \tag{8}$$

Using equations (5), (7), and (8) with equation (6) yields:

$$I_0 = V_O/R_L + (C_L + C_1)d(V_O)/dt. \tag{9}$$

Second, we determine the current limit $I_C$ based upon $I_0$ in equation (9) as follows. Denoting the ratio of the emitter area of transistor Q7 to the emitter area of transistor Q6 by A, and the resistances of resistors $R_2$ and $R_3$ by, respectively, $R_2$ and $R_3$, we obtain from the Ebers-Moll relationship:

$$I_s = [(V_T/R_2) {}^* ln(D/A)] + I_0 {}^* (R_3/R_2), \tag{10}$$

where $V_T$ is the thermal voltage kT/q (25.3 mV at room temperature) and D is the ratio of $I_0$ to $I_s$.

Current limit is involved when $I_s$ is slightly greater than $I_c$, and therefore we set:

$$I_s = I_c. \tag{11}$$

From node 80 of FIG. 2, we have $$I_3 = I_b \cdot I_c. \tag{12}$$

Therefore from equations (9) through (12) we obtain the following expression for $I_3$:

$$I_3=I_b-[(V_T/R_3)ln(D/A)]-[V_C/R_1+(C_L+C_1)d(V_0)/dt](R_2/R_3). \quad (13)$$

In a preferred embodiment, values for $R_1$, $R_2$, $R_3$, $C_1$, $C_L$, D, and A will be such that first two terms on the right hand side of eq. (13) are significantly larger than the remaining terms when $d(V_0)/dt$ is bounded as in eq. (5), so that a good approximation for $I_3$ is $$I_3=I_b-[(V_T/R_3)ln(D/A)],$$

and therefore in a preferred embodiment $I_3$ will stay fairly constant over changes in $V_0$.

Figures 3, 3B:
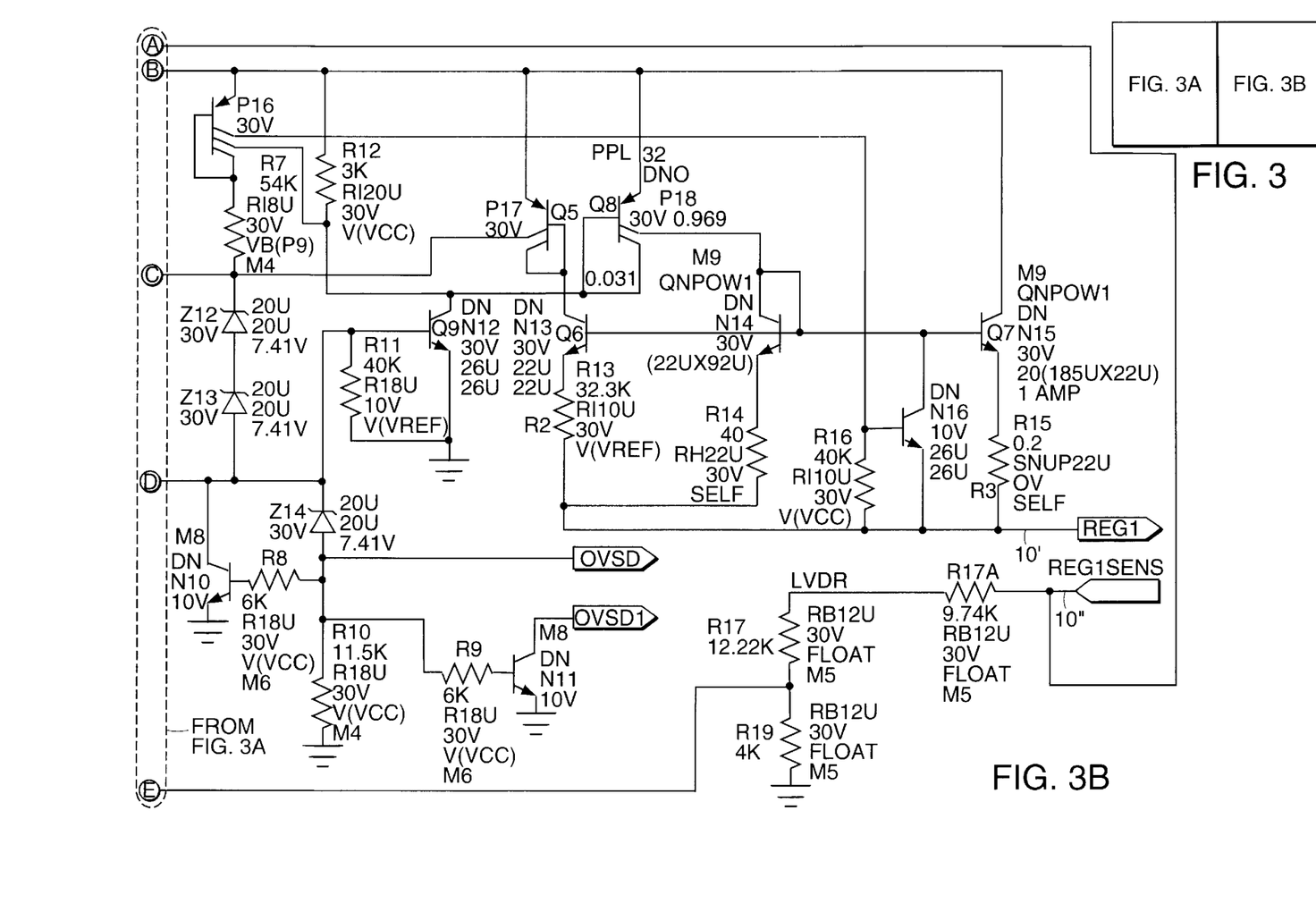
FIG. 3 is a circuit diagram of an embodiment of the present invention.
Figure 3A:
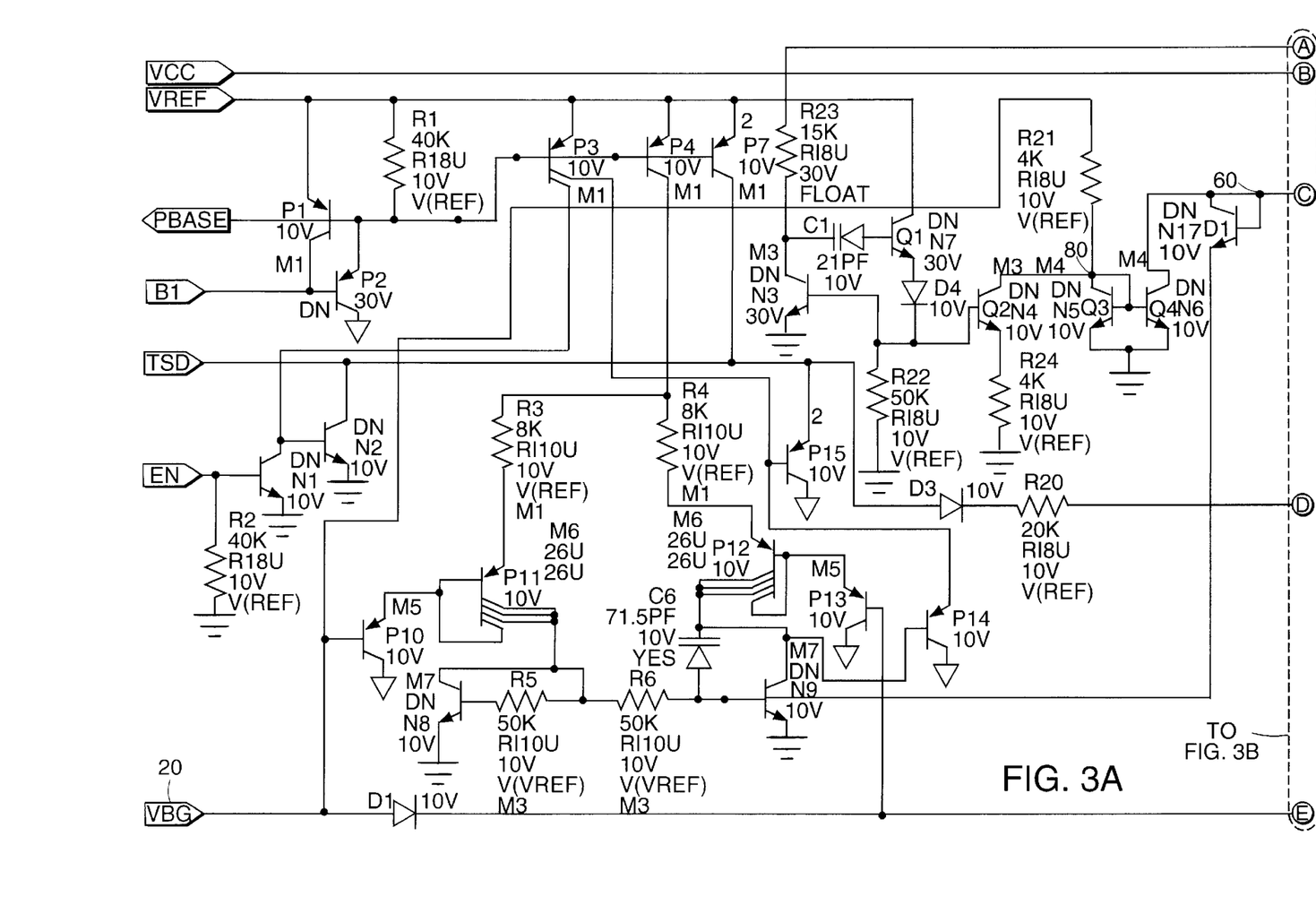

It is possible to remove transistor Q1 and resistor $R_1$ and connect the base terminal of transistor Q2 to the node $V_b$ in FIG. 3. However, transistor Q1 and resistor $R_1$ serve the purpose of keeping transistor Q2 off when $V_0$ is constant and the junction capacitance $C_1$ is leaky. Any leakage current through junction capacitance $C_1$ will be multiplied by transistor's Q1 beta and shunted to ground through resistor $R_1$, thereby maintaining transistor Q2 as nonconducting.

It is also interesting to note that junction capacitance $C_1$ is a diode that is connected in a fashion as to utilize its reverse bias junction capacitance. This is useful for the case when $V_0$ is suddenly pulled to ground by any number of events, such as a short to ground or a disable, because diode $C_1$ becomes forward biased and presents a drain path for the charge accumulated at the node $V_b$. If junction capacitance $C_1$ was a true parallel plate capacitor, there would be a time constant associated with the discharge of the parallel plate capacitor through the base-collector junction of transistor Q1 to output terminal 10. This would limit the performance of the circuit when the parallel plate capacitor was not fully discharged and the circuit was restarted.

Another embodiment of the present invention is illustrated in FIG. 3. Some of the components in FIG. 3 are labeled with the same symbol as corresponding components in FIG. 2. Resistors $R_{23}$ and $R_{24}$ and transistor N3 have been added to the current limit section so as to improve the stability of the circuit. Diode $D_4$ has been added to ensure that diode $C_1$ does not breakdown at high output voltages and clamp the output. Terminals 10' and 10" are connected together outside the chip package, and together they serve the function of output terminal 10 of FIG. 2.

The bias control circuit is comprised of transistors N8, N9, P10, P11, P12, and P13, resistors $R_3$, $R_4$, $R_5$, and $R_6$, diode C6, and current mirror transistor P. It is recognized as a difference or error amplifier. Transistor N17, which serves as diode $D_1$ of FIG. 2, is connected to the base of transistor N9. When diode $D_1$ is not forward biased, the bias control circuit amplifies the difference in voltages at the base of transistors P10 and P14. When diode $D_1$ is forward biased (indicating that the too much current is flowing to the load), transistor N9 is brought toward saturation and the voltage at its collector decreases, which in turn decreases the current conducted by transistor Q9 via the two emitter followers comprising transistors P14 and P15, which in turn decreases the load current provided by pass transistor Q7 as explained in connection with FIG. 2. The junction capacitance of diode C6 and resistors $R_5$ and $R_6$ provide stability.

Figure 4:
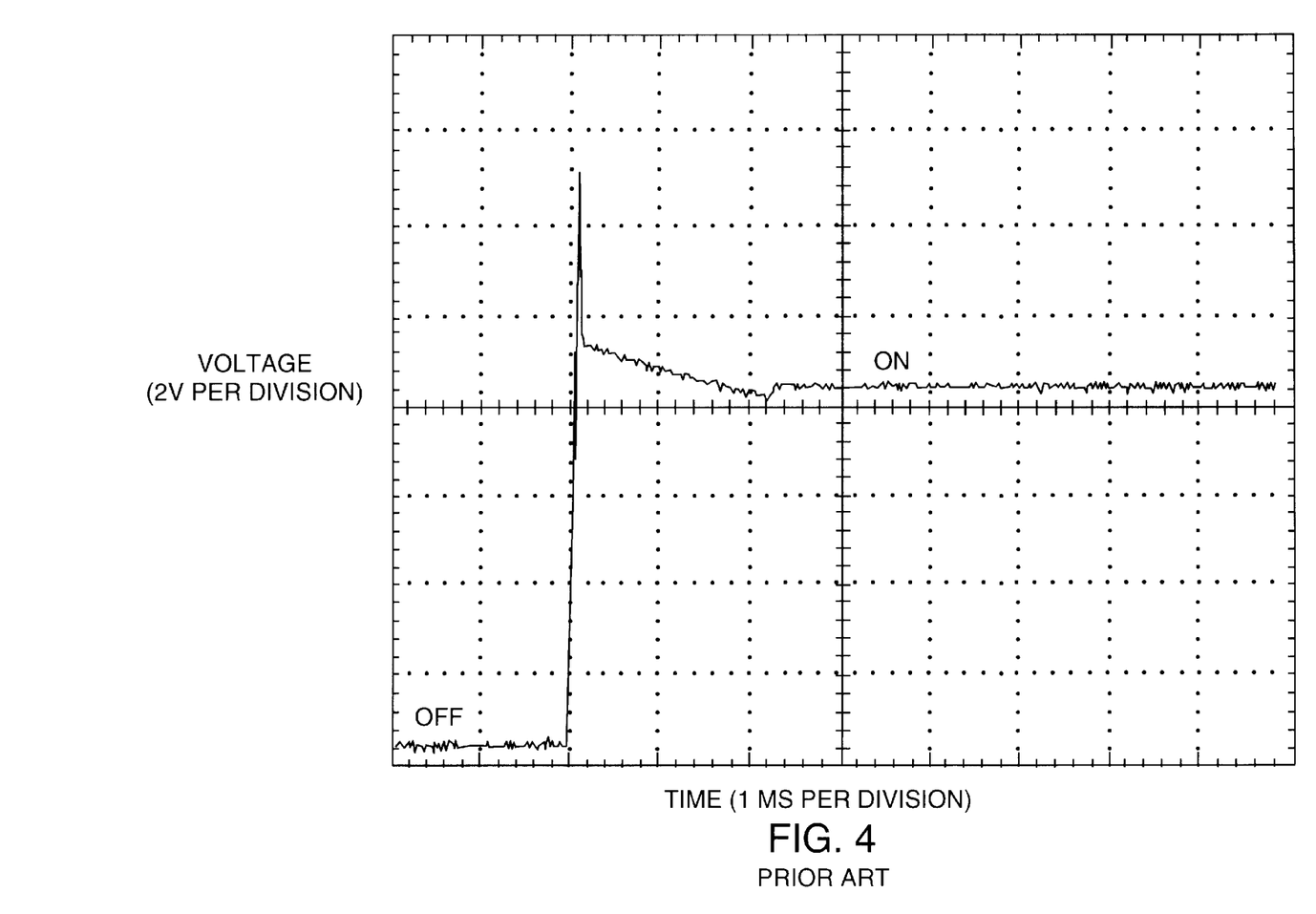
FIG. 4 is a plot exhibiting voltage overshoot for a prior art driver circuit.
Figure 5:
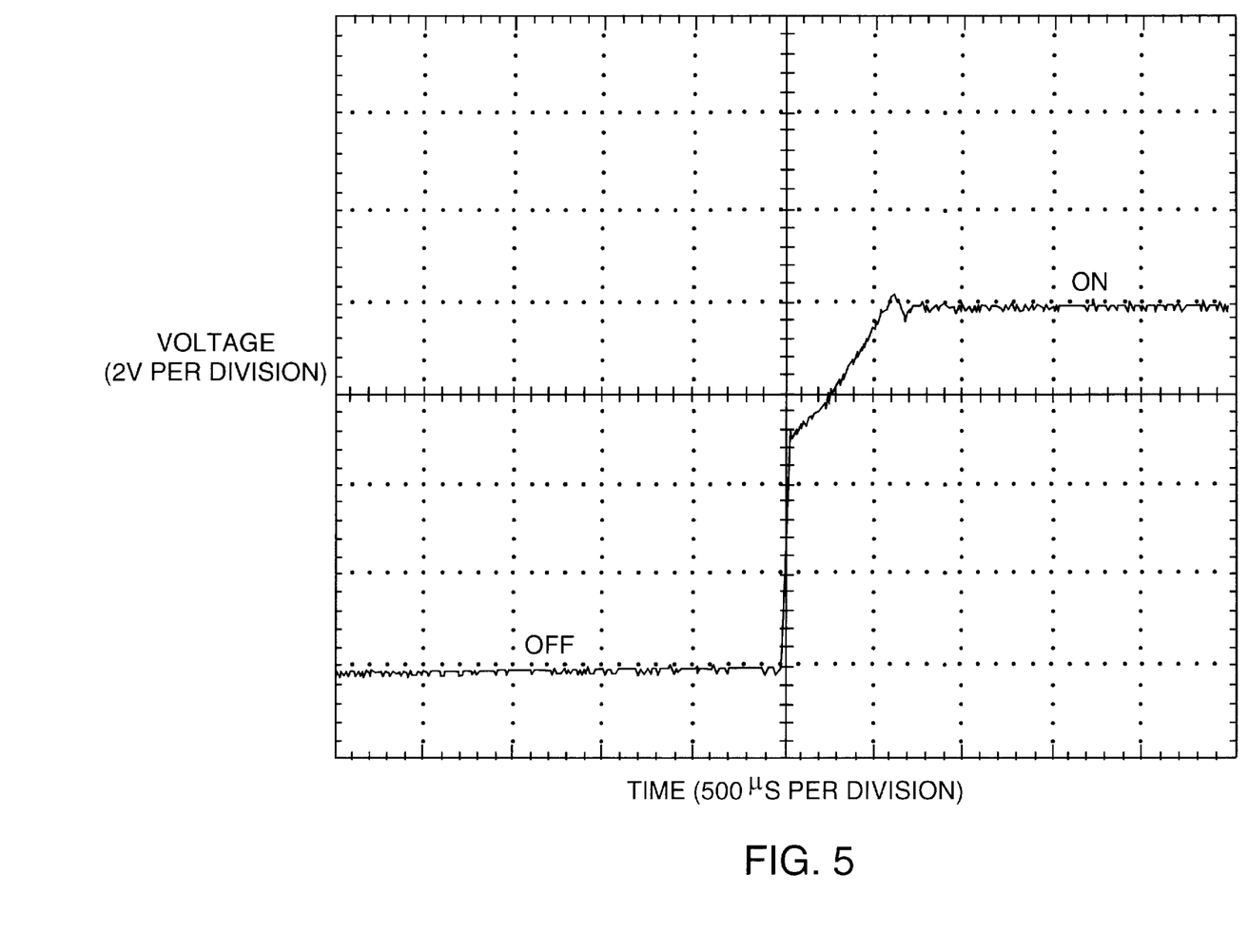
FIG. 5 is a plot exhibiting output voltage vs. time for an embodiment of the present invention.

An example of the improvement of an embodiment of the present invention over the prior art can been seen from FIGS. 4 and 5. Both FIGS. 4 and 5 are plots providing output voltage vs. time for a prior art driver and an embodiment of the present invention, respectively, in which the output voltage of the two drivers are programmed to quickly transition from LOW to HIGH. As can be seen from FIG. 4, the output voltage of a prior art driver exhibits an overshoot before settling down to its steady state HIGH value.

However, from FIG. 5, we see that for an embodiment of the present invention, there is no overshoot in output voltage as it transitions from LOW to HIGH.

I claim:

1. A current limit circuit for limiting overshoot of an output voltage at an output terminal of a driver circuit, the driver circuit having a current limit threshold and a bias control circuit to limit the driver circuit's output current, the current limit circuit comprising:

capacitance means, coupled to the output terminal of the driver circuit, for providing a current to establish a voltage indicative of the rate of change of the output voltage; and a first transistor responsive to the capacitance means such that when the voltage established by the current from said capacitance means is sufficiently high, the first transistor is brought into conduction so as to conduct a collector current, the first transistor coupled to the current limit circuit so that an increase in the collector current of the first transistor decreases the current limit threshold so as to limit overshoot of the output voltage of the driver circuit.

2. The current limit circuit as set forth in claim 1, wherein the capacitance means comprises a diode, the diode having a cathode with a cathode voltage, the diode cathode coupled to the output terminal of the driver circuit so that the cathode voltage is substantially equal to the output voltage.

3. The current limit circuit as set forth in claim 2, further comprising a second transistor having a base connected to the anode of the diode via a first low resistance line and an emitter connected to the base of the first transistor via a second low resistance line.

4. A driver circuit comprising:

an output terminal having an output voltage;

a pass transistor to supply current to a load when the load is connected to the output terminal, the pass transistor having a base and an emitter with an emitter current;

a first transistor having an emitter with an emitter current, and having a base connected to the base of the pass transistor and its emitter coupled to the emitter of the pass transistor so that the emitter current of the first transistor is indicative of the emitter current of the pass transistor;

a first current mirror coupled to the first transistor and the pass transistor to provide at a first node a sense current indicative of both the emitter current of the first transistor and the emitter current of the pass transistor;

a second current mirror coupled to the first node, the second current mirror including:
 a diode configured second transistor to receive a control current and having a base; and
 a third transistor having a base connected to the base of the second transistor and having a collector coupled to the first node;

a first diode having an anode coupled to the first node so that when the first diode is forward biased the magnitude of the sense current is greater than the magnitude of the control current, and the first diode is reversed biased when the sense current is equal to the control current, the first diode having a forward conduction current when forward biased;

a bias control circuit coupled to the first diode to receive the first diode's forward conduction current, the bias control circuit having a first input having a reference voltage and a second input coupled to the output terminal with a voltage indicative of the output voltage, the bias control circuit coupled to the base of the pass transistor to regulate the emitter current of the pass transistor so that when the first diode is not forward biased the output voltage is regulated according to the reference voltage and when the first diode is forward biased the emitter current of the pass transistor is reduced in response to the forward conduction current;

capacitance means coupled to output terminal of the driver circuit for establishing at a second node a node voltage such that the rate of change of the node voltage is indicative of the rate of change of the output voltage; and a fourth transistor having a base, with a base voltage, coupled to the capacitance means and a collector coupled to the second transistor to reduce the control current and limit output voltage overshoots when the fourth transistor is conducting, the fourth transistor being put into conduction when the node voltage rises to a sufficient level due to a rapid rise of the output voltage, the base voltage of the fourth transistor responsive to the node voltage when the fourth transistor is in conduction.

5. The driver circuit as set forth in claim 4, further comprising:

a fifth transistor having an emitter and a base with a base voltage substantially equal to the node voltage and coupled to the second node as an emitter follower with its emitter coupled to the base of the fourth transistor.

6. The driver circuit as set forth in claim 4, wherein the capacitance means comprises a second diode having a cathode with a cathode voltage, the second diode's cathode coupled to the output terminal of the driver circuit so that the cathode voltage is substantially equal to the output voltage.

7. The driver circuit as set forth in claim 5, wherein the capacitance means comprises a second diode having a cathode with a cathode voltage, the second diode's cathode coupled to the output terminal of the driver circuit so that the cathode voltage is substantially equal to the output voltage.

8. The driver circuit as set forth in claim 7, wherein the bias control circuit comprises an error amplifier, having an output with an output voltage, wherein the output voltage of the error amplifier is responsive to a voltage difference between the first and second inputs of the bias control circuit when the first diode is not forward biased, the error amplifier comprising an active load coupled to the first diode so that the output voltage of the error amplifier is reduced when the first diode is forward conducting, the output of the error amplifier coupled to the base of the pass transistor so that the emitter current of the pass transistor increases as the output voltage of the error amplifier increases.

9. A driver circuit comprising:

an output node having an output voltage;

a pass transistor to supply current to a load when the load is connected to said output node;

a reference current source providing a reference current;

a current limit circuit coupled to said reference current source and said pass transistor for setting a current limit threshold for the current from said pass transistor; and a capacitance coupled between said output node and said current limit circuit so as to reduce the current limit threshold in response to a rapid increase in the output voltage.

10. The driver circuit of claim 9 wherein said capacitance comprises a reverse bias junction capacitance of a diode.

11. The driver circuit of claim 9 further comprising a sink transistor, having a collector coupled to said reference current source, a base coupled to said capacitance and an emitter coupled to ground, for sinking a portion of the reference current when brought into conduction in response to a rapid increase in the output voltage detected through said capacitance.

12. The driver circuit of claim 11 further comprising a transistor having a base connected to said capacitance via a first low resistance line and an emitter connected to the base of the sink transistor via a second low resistance line wherein a voltage at the base of said transistor is indicative of a rate of change of the output voltage.

13. A driver circuit for limiting overshoot of an output voltage at an output node comprising:

a capacitance, coupled to the output node, for providing a current to establish a node voltage indicative of the rate of change of the output voltage;

a current limit circuit for setting a current limit threshold for current at the output node; and a first transistor having a collector and having a base coupled to said capacitance so that when the node voltage rises to a sufficient level due to a rapid rise of the output voltage, said first transistor is brought into conduction and wherein the collector is coupled to said current limit circuit so that conduction of current by the collector decreases the current limit threshold so as to limit overshoot of the output voltage of the driver circuit.

14. The driver circuit of claim 13 wherein said capacitance comprises a reverse bias junction capacitance of a diode.

15. The driver circuit of claim 14 further comprising a second transistor having a base connected to said capacitance via a first low resistance line and an emitter connected to the base of the first transistor via a second low resistance line.

* * * * *

UNITED STATES PATENT AND TRADEMARK OFFICE
CERTIFICATE OF CORRECTION

PATENT NO.   : 5,838,524
DATED        : November 17, 1998
INVENTOR(S)  : Timothy A. Phillips It is certified that error appears in the above-identified patent and that said Letters Patent is hereby corrected as shown below:

Claim 1, line 1, change "A current" to --An overshoot--;

Claim 1, line 2, after "circuit having", insert --a current limit circuit that sets--;

Claim 1, line 3, change "current limit" to --overshoot limit--.

Claim 2, line 1, change "current" to --overshoot--.

Claim 3, line 1, change "current" to --overshoot--.

Signed and Sealed this

Twenty-third Day of March, 1999

Attest:

Q. TODD DICKINSON

*Attesting Officer*          *Acting Commissioner of Patents and Trademarks*